(12) United States Patent
Imaeda et al.

(10) Patent No.: US 6,616,195 B2
(45) Date of Patent: Sep. 9, 2003

(54) CONNECTOR

(75) Inventors: Tomohisa Imaeda, Aichi-ken (JP); Mitsutaka Kondo, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 10/091,570

(22) Filed: Mar. 7, 2002

(65) Prior Publication Data

US 2002/0125721 A1 Sep. 12, 2002

(30) Foreign Application Priority Data

Mar. 9, 2001 (JP) ........................................ 2001-066593

(51) Int. Cl.⁷ ................................................. F16L 37/12
(52) U.S. Cl. ..................... 285/319; 285/305; 285/921
(58) Field of Search ................................. 285/319, 921, 285/305, 322

(56) References Cited

U.S. PATENT DOCUMENTS

| | | | |
|---|---|---|---|
| 4,915,420 A | | 4/1990 | Washizu .................... 285/39 |
| 4,981,586 A | * | 1/1991 | Bartholomew .............. 210/435 |
| 5,067,754 A | * | 11/1991 | Bartholomew .............. 285/319 |
| 5,161,833 A | * | 11/1992 | McNaughton et al. ...... 285/319 |
| 5,324,082 A | * | 6/1994 | McNaughton et al. ........ 285/93 |
| 5,441,313 A | | 8/1995 | Kalahasthy ................... 285/93 |
| 5,924,746 A | | 7/1999 | Fixemer ...................... 285/93 |

FOREIGN PATENT DOCUMENTS

| | | | |
|---|---|---|---|
| DE | 3710853 | * 10/1988 | ................. 285/319 |
| EP | 0992729 A1 | 4/2000 | |
| JP | 5-34389 | 5/1993 | |

OTHER PUBLICATIONS

Japanese Patent Abstract No. 10185030, dated Jul. 14, 1998.

* cited by examiner

Primary Examiner—Lynne H. Browne
Assistant Examiner—G M Collins
(74) Attorney, Agent, or Firm—Posz & Bethards, PLC

(57) ABSTRACT

A connector comprises a casing 20 with a pipe fitting bore 25 to which a pipe P is fitted; a pipe fixing component 30 which slides against the casing and fixed the pipe P when the pipe is fitted to the pipe fitting bore 25; and a seal component 40 that is mounted facing the pipe duct 26 to seal the pipe P. The pipe fixing component 30 is elastically deformed, when the pipe P is fitted, from the temporary stop position at which it is temporarily stopped in the pipe fitting bore 25, and moves to the connecting position where the pipe is fixed, it being possible to externally view whether the pipe fixing component 30 is in the connecting position. The connector requires no checker or the like to check the connection with the pipe P, thus preventing poor seals.

16 Claims, 6 Drawing Sheets

CONNECTOR

This application claims the benefit of and priority from Japanese Application No. 2001-66593 filed Mar. 9, 2001, the content of which is incorporated herein by reference.

BACKGROUND OF THE INVENTION

1. Field of the Invention

The present invention relates to a connector for connecting a pipe with one touch.

2. Description of the Related Art

A conventionally known example of this type of connector is described in JU 5-34389A. In this technique, a pipe is fitted to the connector and is secured by a retainer, and the pipe connection can be checked by pressing a sensor (checker) when the pipe has been connected.

However, the conventional technique requires the checker for observing the connection, whereas a reduction in the number of parts would be more desirable.

Furthermore, a satisfactory seal cannot always be achieved with the seal component in cases where the pipe is fitted to the connector when the retainer is in a temporarily stopped position.

SUMMARY OF THE INVENTION

The present invention provides a connector which requires no checker or the like, and which allows unsatisfactory seals to be readily ascertained.

To solve this problem, an exemplary first embodiment of the present invention provides a connector for connecting a pipe to another flow passage by engagement with a pipe engagement component formed on an outer circumference of the pipe. The connector comprises a casing having a pipe duct configured to be connected to the pipe and a pipe fitting bore connected to the pipe duct. The connector further comprises a pipe fixing component, slidably supported by the pipe fitting bore, for fixing the pipe to the casing, the pipe fixing component being constructed and arranged to have a temporary stop position for no fixing of the pipe and a connecting position for fixing of the pipe, the pipe fixing component being elastically deformable when sliding in the pipe fitting bore from the temporary stop position to the connecting position and a seal component mounted facing the pipe duct for sealing the pipe.

The connector is constructed and arranged to enable the pipe fixing component to be visibly observable in the connecting position.

When a pipe is fitted to the pipe fitting bore, the connector of the present invention allows the pipe to press the pipe fixing component, causing it to slide from the temporary stop position, so that the pipe fixing component engages with the pipe engagement component of the pipe to push it into the pipe fitting bore. The pipe fixing component elastically deforms with the sliding movement, and moves to the connecting position for fixing the pipe. The pipe fixing component permits the viewer to externally view whether the pipe is fixed at the connecting position.

The pipe can thus be attached to the connector with one touch when the pipe is fitted to the pipe fitting bore to slide the pipe fixing component.

The connector of the present invention is also easy to handle because the pipe fixing component is mounted while temporarily stopped in the casing when the pipe is not yet connected.

The connector is furthermore constructed with 3 components comprising a casing, pipe fixing component, and seal component, requiring no checker to check whether the parts have been connected with a good seal. The number of parts may therefore be reduced, resulting in a lighter and less expensive product.

In a preferred embodiment of the casing in the present invention, the structure comprises a viewing window allowing the viewer to check whether the pipe fixing component is in the connecting position. Such a structure allows the connecting position of the pipe fixing component to be externally checked through the window, thus ensuring that the pipe is properly connected.

A preferred embodiment of the pipe fixing component will comprise a support base slidably formed in the pipe fitting bore; a pipe engagement tab with an engagement groove extending in the sliding direction from the support base so as to engage the pipe engagement component; and a stopper engagement tab with a stopper extending in the sliding direction from the support base so as to engage with the casing for positioning at the temporary stop position and connecting position; wherein the stopper engagement tab allows the pipe fixing component to be externally viewed through the viewing window when in the connecting position.

In this structure, when the pipe fixing component fits the pipe to the pipe fitting bore, the pipe engagement tab elastically deforms, resulting in the engagement of the pipe engagement component of the pipe by the engagement groove in order to stop the pipe. At the same time, the stopper engagement tab moves to the viewing window to position the pipe fixing component at the connecting position, allowing the viewer to see through the window whether the fixing component is in the connecting position.

In another preferred embodiment of the connector, when the pipe fixing component is in the connecting position without fixing the pipe, the pipe will not reach the location of the seal component while fitted into the pipe fitting bore. This structure prevents unsatisfactory seals because the pipe will not reach the location of the seal component no matter what type of external force causes the pipe fixing component to slide to the connecting position in the pipe fitting bore.

In yet another preferred embodiment of the connector, the pipe will not reach the location of the seal component when fitted into the pipe fitting bore as long as the pipe fixing component is in the temporary stop position. Unsatisfactory seals are prevented in this structure because the pipe will not reach the seal component whenever the pipe fixing component is in the temporary stop position while the pipe is inserted into the pipe fitting bore.

DESCRIPTION OF THE PREFERRED EMBODIMENTS

Figure 1:
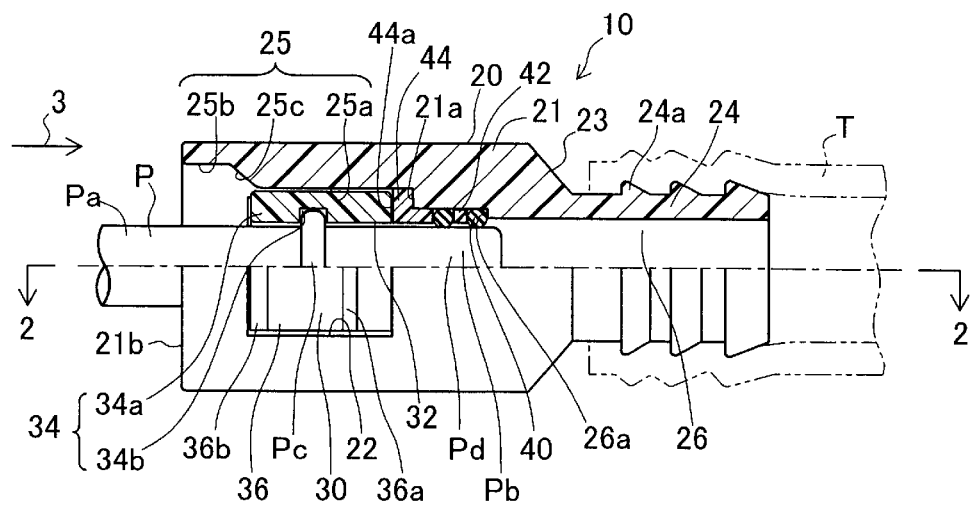
FIG. 1 is a half section illustrating a pipe and tube connected in the connecting position by a connector in an embodiment of the present invention.
Figure 2:
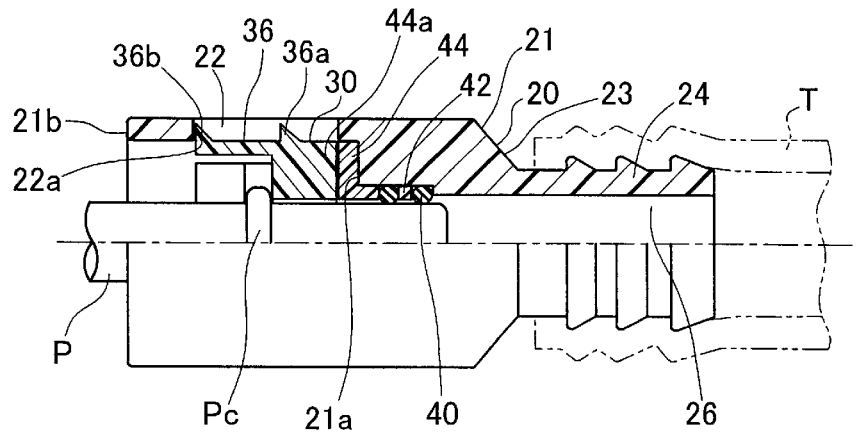
FIG. 2 is a half section along line 2—2 in FIG. 1.
Figure 3:
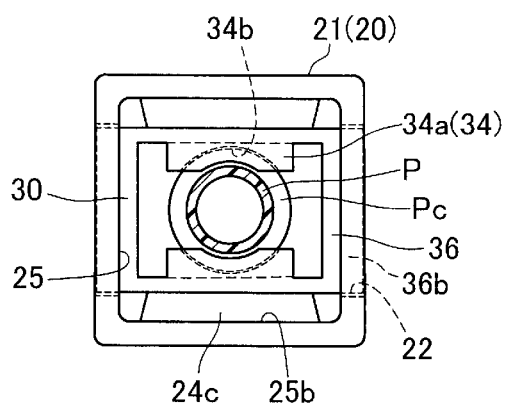
FIG. 3 is a view in the direction indicated by arrow 3 in FIG. 1.

FIG. 1 is a half sectional view illustrating a pipe P and tube T connected in the connecting position by a connector 10 in an embodiment of the present invention; FIG. 2 is a half section along line 2—2 in FIG. 1; and FIG. 3 is a view in the direction indicated by arrow 3 in FIG. 1. In FIGS. 1 through 3, the connector 10 is used in the fuel line system from an automobile fuel tank to an engine to connecting the resin pipe P with one touch.

In FIG. 1, the pipe P comprises a pipe main unit Pa. A pipe engagement component Pc is also provided in the form of a ring around the outer circumference of the pipe main unit Pa.

The connector 10 comprises a casing 20, pipe fixing component 30, seal component 40, spacer 42, and seal retainer 44.

Figure 4:
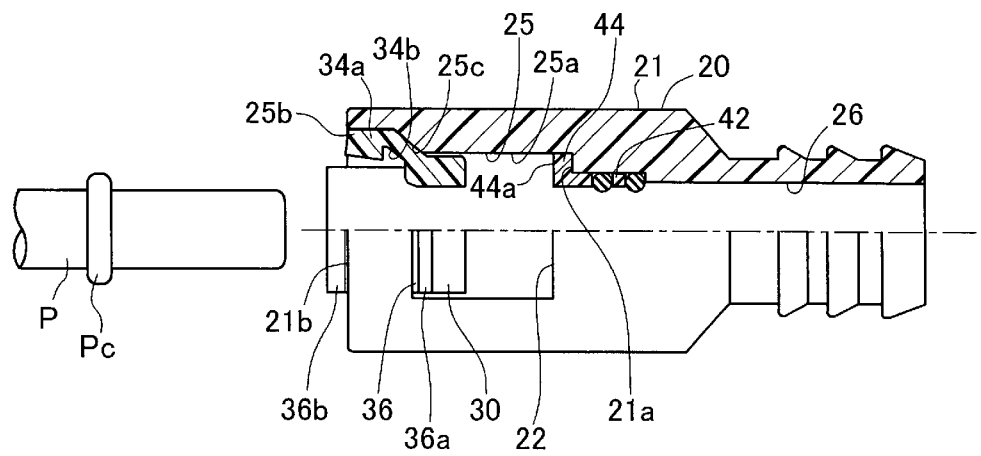
FIG. 4 is a half section illustrating a pipe, at a point corresponding to FIG. 1, in the temporary stop position before being fitted to the connector.
Figure 5:
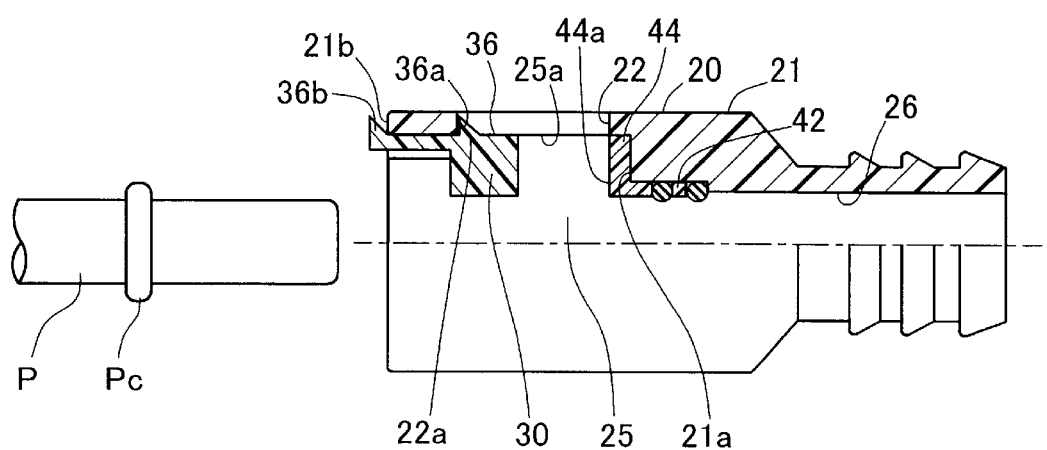
FIG. 5 is a half section illustrating the pipe, at a point corresponding to FIG. 2, in the temporary stop position before being fitted to the connector.

FIG. 4 is a half sectional view illustrating a pipe P, at a position corresponding to FIG. 1, in the temporary stop position before being fitted to the connector 10; and FIG. 5 is a half sectional view illustrating the pipe P, at a position corresponding to FIG. 2, in the temporary stop position before being fitted to the connector 10. In FIGS. 4 and 5, the casing 20 comprises a casing main unit 21. The casing main unit 21 comprises a reduced diameter component 23, with the diameter reduced toward the tube T; a nipple 24 is integrally formed at the tip of the reduced diameter component 23. A catch 24a for catching the tube T is formed in the shape of three rows of annular ridges on the nipple 24.

A pipe fitting bore 25 is formed in the casing main unit 21. The pipe fitting bore 25 is connected to a pipe duct 26 formed in the nipple 24. An engagement wall 21a is formed between the pipe fitting bore 25 and the pipe duct 26. The engagement wall 21a engages the end of the pipe fixing component 30, with a seal retainer 44 interposed therebetween, to control the movement of the pipe fixing component 30. The pipe fitting bore 25 comprises a small bore 25a connected to the pipe duct 26, a large bore 25b formed on the open side and a guide tapered surface 25c formed between the small bore 25a and the large bore 25b. The guide tapered surface 25c is an incline where the pipe presses against the pipe fixing component 30, causing the pipe fixing component 30 to elastically deform when the pipe is fitted.

A ring-shaped stepped portion 26a is formed, with a greater diameter than the pipe duct 26, between the pipe fitting bore 25 and the pipe duct 26 of the nipple 24. Seal components 40 and 40 consisting of O-rings are retained at the ring-shaped stepped component 26a. A spacer 42 is interposed between the seal components 40 and 40, and the seal retainer 44 is pressed in the ring-shaped stepped component 26a to retain the seal components 40 and 40. The seal components 40 and 40 are pressed against the seal surface Pd of the pipe P to create a seal. Instead of a structure which is pressed onto the ring-shaped stepped component 26a, the seal retainer 44 can be a structure which engages and catches the engagement wall 44a by means of catches (not shown in Fig.) extending from the inner peripheral wall of the pipe fitting bore 25 toward the center.

Viewing windows 22 and 22 are formed in two facing locations through the pipe fitting bore 25 in the outer circumferential wall of the casing main unit 21. The viewing windows 22 and 22 are openings for observing the position of the pipe fixing component 30 from outside the casing 20.

Figure 6:
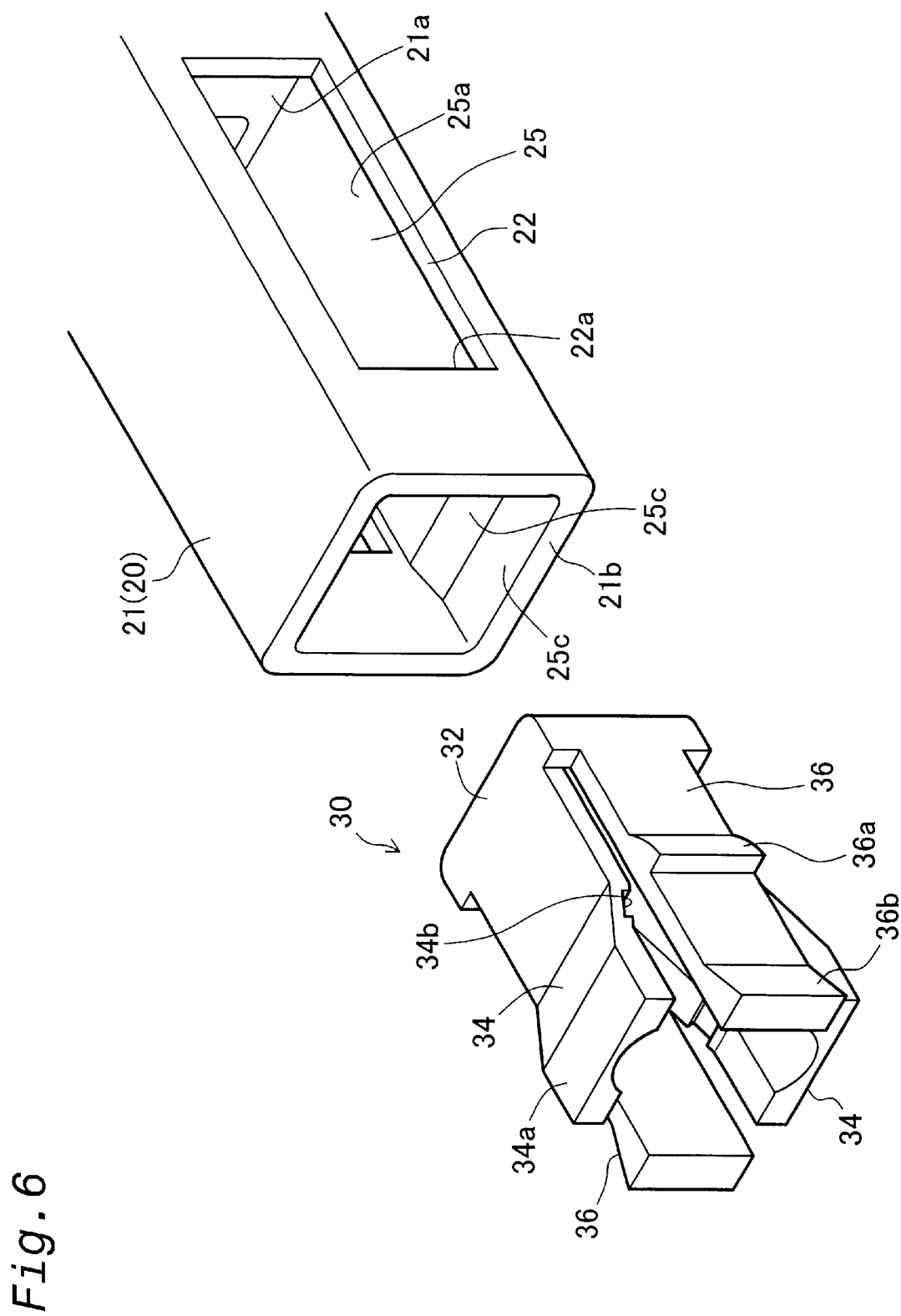
FIG. 6 is an oblique view of a portion of the casing main unit and the pipe fixing component.

FIG. 6 is an oblique view of a portion of the casing main unit 21 and the pipe fixing component 30. In FIG. 6, the pipe fixing component 30 is interposed between the pipe P (see FIG. 1) and the casing 20 to fix the pipe P, and is slidably formed relative to the casing 20. Specifically, the pipe fixing component 30 comprises a support base 32 with a square cross section, pipe engagement tabs 34 and 34, and stopper engagement tabs 36 and 36, these being integrally formed.

The pipe engagement tabs 34 and 34 are cantilever tabs projecting parallel to each other from an end of the support base 32, and are bent midway into a bent edge 34a, with the end expanding outward. As illustrated in FIG. 4, the bent edge 34a is bent so that it is elastically deformed, from a shape that conforms to the guide tapered surface 25c, to conform to the small bore 25a as illustrated in FIG. 1. An engagement groove 34b is formed on the inside of the pipe engagement tabs 34 and 34. The engagement groove 34b is arc-shaped, and catches the pipe P when engaged with the pipe engagement component Pc (see FIG. 1) of the pipe P.

The stopper engagement tabs 36 and 36 are cantilever tabs disposed parallel to each other, and are disposed in a location which can be viewed through the viewing windows 22. A first stopper 36a and second stopper 36b project from the outside of each of the stopper engagement tabs 36 and 36. The first stopper 36a and second stopper 36b are protrusions for engaging the fixed end 22a and open end 21b of the viewing window 22 to position the pipe fixing component 30 relative to the casing 20.

The operations involved in connecting the pipe P to the connector 10, and the associated functions, are described below. When the pipe P is pressed from the temporary stop position depicted in FIGS. 4 and 5 into the pipe fitting bore 25 of the connector 10, the pipe engagement component Pc of the pipe P engages with the engagement groove 34b of the pipe fixing component 30, and the pipe fixing component 30 slides into the pipe fitting bore 25. As the pipe fixing component 30 slides, the bent edge 34a of the pipe engagement tab 34 presses against the guide tapered surface 25c and is elastically deformed, allowing the pipe fixing component 30 to move to the small bore 25a, where it is stopped by the engagement wall 44a of the seal retainer 44. At that time, the stopper engagement tab 36 is pressed at the second stopper 36b by the open end 21b of the casing 20, is elastically deformed inward, and moves further past the fixed end 22a of the viewing window 22, releasing the elastic force. This allows the second stopper 36b to position the pipe fixing component 30. While these parts are thus disposed, the pipe tip Pb is pushed into the seal component 40, and the seal surface Pd is sealed by the seal component 40, allowing the connector 10 to connect the tube T and pipe P. While these parts are thus connected, the viewing windows 22 are closed up by the stopper engagement tabs 36 of the pipe fixing component 30, making it possible to check that the pipe P is fixed by the pipe fixing component 30.

To remove the pipe P from the connector 10, the stopper engagement tabs 36 can be pressed through the viewing windows 22, allowing the pipe P to be withdrawn. Specifically, the second stopper 36b of the stopper engagement tabs 36 is disengaged from the fixed end 22a, and when the pipe P is taken out in this released state, the pipe fixing component 30 moves integrally with the pipe P along the casing 20, while the first stopper 36a comes into contact with the fixed end 22a of the viewing window 22, so that the pipe fixing component 30 is held in the casing 20, allowing just the pipe P to be taken out.

The connector 10 provides the following advantages.

(1) When the pipe P is fitted to the pipe fitting bore 25 to slide the pipe fixing component 30, the pipe P can be attached to the connector 10 with one touch.

(2) The position of the stopper engagement tabs 36 can be viewed through the windows 22 to check that the pipe P has been positioned by the pipe fixing component 30 at the connecting position, thereby preventing connections with poor seals.

(3) The connector 10 is made of five parts comprising the casing 20, the pipe fixing component 30, the seal component 40, the spacer 42 and the seal retainer 44, and requires no checker for observing whether the conventional connector is a good seal or not. It is thus possible to reduce the number of parts, resulting in a lighter and less expensive product.

(4) As illustrated in FIG. 5, the first stoppers 36a of the stopper engagement tabs 36 come into contact with the fixed ends 22a of the viewing windows 22, and the second stoppers 36b come into contact with the open ends 21b, so that the pipe fixing component 30 is temporarily stopped by the casing 20. This stop allows the pipe fixing component 30 to be shipped and handled while united with the casing 20, resulting in easier handling.

Figure 7:
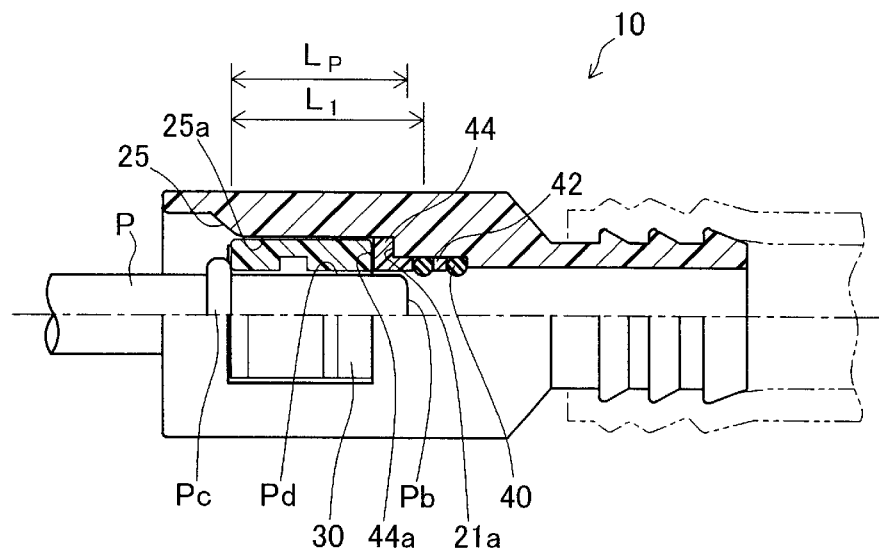
FIG. 7 illustrates the action of the connector.

(5) FIG. 7 illustrates the action of the connector 10. As illustrated in FIG. 7, the pipe fixing component 30 can sometimes be pressed by external force into the small bore 25a of the pipe fitting bore 25 without the pipe P being fixed. In such cases, L1>Lp, where L1 is the distance from the end of the pipe fixing component 30 to the seal component 40, and Lp is the distance from the pipe engagement component Pc to the tip of the pipe tip Pb. Thus, when the pipe P is inserted until the pipe engagement component Pc comes into contact with the end face of the pipe fixing component 30, the pipe tip Pb does not reach the seal component 40. As such, the seal surface Pd is not sealed by the seal component 40. Because the pipe P is not completely supported by the connector 10 while these parts are thus disposed, it can readily be determined by touch that the pipe P is not connected.

Figure 8:
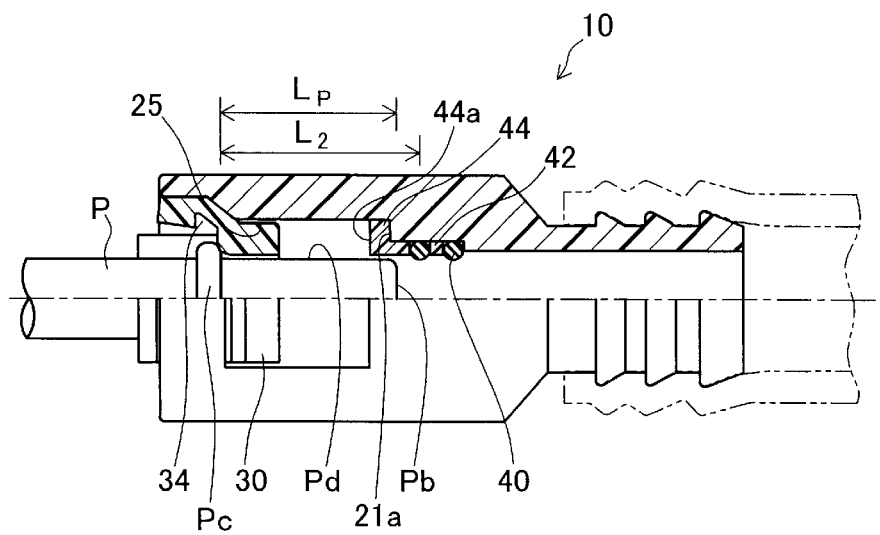
FIG. 8 illustrates another action of the connector.

(6) FIG. 8 illustrates another action of the connector 10. As illustrated in FIG. 8, the pipe fixing component 30 is in the temporary stop position where it is not fitted into the pipe fitting bore 25. In such cases, L2>Lp, where L2 is the distance from the engagement groove 34b of the pipe fixing component 30 to the seal component 40. Thus, even if the pipe P is inserted into the pipe fitting bore 25 while in the temporary stop position, the pipe tip Pb of the pipe P will not reach the seal component 40. As such, the seal surface Pd is not sealed by the seal component 40. Because the pipe P is not completely supported by the connector 10 while these parts are thus disposed, it can readily be determined by touch that the pipe P is not connected.

The present invention is not limited to the above embodiments, and is capable of being worked in various other embodiments within the scope of the essence of the invention. The following variants are possible, for example.

Figure 9:
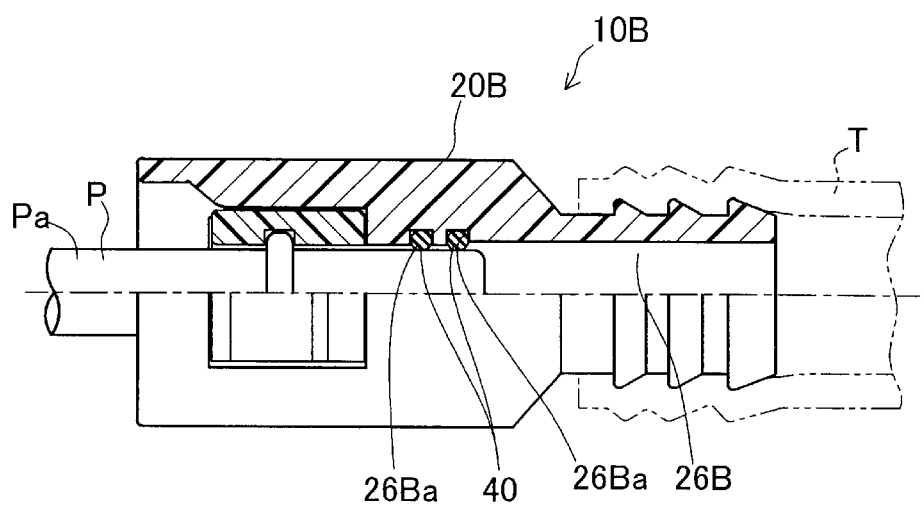
FIG. 9 is a half section illustrating the pipe and tube connected by the connector in the connecting position in another embodiment.

Various types of structures may be adopted for attaching the seal component. For example, as indicated by a connector 10B in FIG. 9, two rows of annular grooves 26Ba and 26Ba may be formed facing a pipe duct 26B of a casing 20 and a seal components 40 and 40 comprising O-rings can be retained in the annular grooves 26Ba and 26Ba.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A connector for connecting a pipe to another flow passage by engagement with a pipe engagement component formed on an outer circumference of the pipe, the connector comprising:

casing having (i) a pipe duct configured to be connected to the pipe, (ii) a pipe fitting bore connected to the pipe duct and (iii) a viewing window;

a pipe fixing component, slidably supported by the pipe fitting bore, for fixing the pipe to the casing, the pipe fixing component being constructed and arranged to have a stopper engagement tab including a temporary stop position for no fixing of the pipe and a connecting position for fixing of the pipe; and a seal component mounted facing the pipe duct for sealing the pipe, wherein the pipe fixing component is configured to be elastically deformable when sliding in the pipe fitting bore from the temporary stop position to the connecting position, and the connector is configured to enable the stopper engagement tab to open the viewing window and the pipe to be observable through the viewing window in the temporary stop position, and to close the viewing window and the pipe to be unobservable through the viewing window in the connecting position.

2. The connector according to claim 1, wherein the pipe fixing component further comprises:

a support base slidably supported in the pipe fitting bore;

a pipe engagement tab extending in the sliding direction from the support base, a pipe engagement tab defining an engagement recess for engaging with the pipe engagement component;

wherein the stopper engagement tab is configured to extend in a sliding direction from the support base.

3. The connector according to claim 2, wherein the connector is configured such that the pipe does not reach the seal component when the pipe is inserted into the pipe fitting bore after the fixing component is put in the connecting position without a pipe.

4. The connector according to claim 3, wherein the connector is configured such that the pipe does not reach the seal component when the pipe is not sufficiently inserted into the pipe fitting bore such that the pipe fixing component does not slide in the pipe fitting bore and maintains the temporary stop position.

5. The connector according to claim 4, wherein the connector is constructed and arranged such that L2>Lp, L2 being a distance from the engagement groove of the pipe fixing component to the seal component, Lp being a distance from the pipe engagement component to an end of the pipe.

6. The connector according to claim 3, wherein the connector is constructed and arranged such that L1>Lp, L1 being a distance from an end of the pipe fixing component to the seal component, Lp being a distance from the pipe engagement component to an end of the pipe.

7. A connector for connecting a pipe to another flow passage by engagement with a pipe engagement component formed on an outer circumference of the pipe, the connector comprising:

a casing having (i) a pipe duct configured to be connected to the pipe and (ii) a pipe fitting bore connected to the pipe duct;

a pipe fixing component, slidably supported by the pipe fitting bore, for fixing the pipe to the casing, the pipe fixing component being constructed and arranged to have a temporary stop position for no fixing of the pipe and a connecting position for fixing of the pipe; and a seal component mounted facing the pipe duct for sealing the pipe, wherein the pipe fixing component is configured to be elastically deformable when sliding in the pipe fitting bore from the temporary stop position to the connecting position, and the connector is configured to enable the pipe fixing component to be observable in the connecting position and wherein the connector is configured such that the pipe does not reach the seal component when the pipe is inserted into the pipe fitting bore after the fixing component is put in the connecting position without a pipe.

8. The connector according to claim 7, wherein the connector is configured such that the pipe does not reach the seal component when the pipe is not sufficiently inserted into the pipe fitting bore such that the pipe fixing component does not slide in the pipe fitting bore and maintains the temporary stop position.

9. The connector according to claim 8, wherein the connector is constructed and arranged such that L2>Lp, L2 being a distance from the engagement recess of the pipe fixing component to the seal component, Lp being a distance from the pipe engagement component to an end of the pipe.

10. The connector according to claim 7, wherein the connector is constructed and arranged such that L1>Lp, L1 being a distance from an end of the pipe fixing component to the seal component, Lp being a distance from the pipe engagement component to an end of the pipe.

11. The connector according to claim 2, wherein the pipe engagement tab is constructed and arrange to elastically deform, when the pipe fixing component is fitted to the pipe fitting bore in a state which the engagement recess engages with the pipe engagement component.

12. The connector according to claim 11, wherein the casing has a tapered surface on the pipe fitting bore, the tapered surface being constructed and arranged to press the pipe engagement tab to deform elastically.

13. The connector according to claim 11, wherein the stopper engagement tab comprises a first stopper and a second stopper that are able to engage with a fixed end formed on the casing, the first stopper engaging with the fixed end in the temporary stopped position, and the second stopper engaging with the fixed end in the connecting position.

14. The connector according to claim 13, wherein the fixed end is formed on an end of the viewing window.

15. The connector according to claim 14, wherein the connector further comprises a seal retainer which presses the seal component against a seal surface of the pipe when the seal retainer is pressed by the pipe fixing component.

16. The connector according to claim 2, wherein the stopper engagement tab is further for disconnecting the pipe from the connector.

* * * * *